United States Patent [19]
Izumida et al.

[11] Patent Number: 4,883,320
[45] Date of Patent: Nov. 28, 1989

[54] SEAT STRUCTURE

[75] Inventors: Satoshi Izumida; Katsumi Kitamura, both of Ayase, Japan

[73] Assignee: Ikeda Bussan Co., Ltd., Ayase, Japan

[21] Appl. No.: 218,265

[22] Filed: Jul. 13, 1988

[30] Foreign Application Priority Data

Jul. 17, 1987 [JP] Japan ............................ 62-107582[U]

[51] Int. Cl.⁴ ................................................ A47C 7/00
[52] U.S. Cl. .................................... 297/452; 297/234; 297/459; 297/460
[58] Field of Search .............. 297/284, 452, 458, 459, 297/460, DIG. 2; 5/432, 446, 447

[56] References Cited

U.S. PATENT DOCUMENTS

| | | | |
|---|---|---|---|
| 3,471,824 | 11/1968 | White et al. | 297/458 X |
| 3,495,871 | 2/1970 | Resag et al. | 297/460 |
| 3,503,649 | 3/1970 | Johnson | 297/458 X |
| 4,077,669 | 3/1978 | Fox | 297/452 |
| 4,522,447 | 6/1985 | Snyder et al. | 297/452 |
| 4,582,361 | 4/1986 | Kennel | 297/452 |
| 4,583,783 | 4/1986 | Kanei | 297/460 X |
| 4,607,887 | 8/1986 | Vail | 297/459 X |
| 4,637,651 | 1/1987 | Sperr | 297/458 |
| 4,761,035 | 8/1988 | Urai | 297/452 |

FOREIGN PATENT DOCUMENTS 46892  3/1982  European Pat. Off. ............ 297/460

Primary Examiner—Peter R. Brown
Attorney, Agent, or Firm—Foley & Lardner, Schwartz, Jeffery, Schwaab, Mack, Blumenthal & Evans

[57] ABSTRACT

Resin-made support panels for supporting the ischium torus, lumbar and shoulder blade portions of a person seated are molded integral onto sheet-like springs which are plain-woven by resin fibers, and side rims of the sheet-like springs are connected to frames by means of hooks.

7 Claims, 6 Drawing Sheets

SEAT STRUCTURE

BACKGROUND OF THE INVENTION

The present invention relates to a structure of seats, particularly of vehicle seats.

PRIOR ART

Seats, particularly vehicle seats are designed from the viewpoint of human-factors engineering to keep persons as less fatigued as possible even when they are seated on the seats for a long time. In addition, the vehicle seats must be intended to improve their productivity, weight and cost as well as their comfortableness which persons feel when they are seated on them.

In the case of the conventional vehicle seat shown in FIG. 1, sheet-like springs 1 are used instead of usual S-like springs and they are attached to seat frames 3 by means of hooks 2. In this seat structure, a pad 4 is then located above the sheet-like spring 1, which is covered by a surface skin 6 with a wadding 5 interposed, as shown in FIG. 2. In the seat structure in which the usual S-like springs are used, the pad 4 must be made so thick as not to make persons feel the stiffness of the S-like springs, but when the sheet-like springs 1 are used, the pad 4 can be made thin. The thickness of the seat itself can be thus made thin, thereby reducing its weight, lowering its cost and making the space in the car room so wider as to make a better use of it.

In this seat structure in which the sheet-like springs 1 are used, however, the whole of the sheet-like spring 1 is flexibly extended by the hip of a person 7, as shown in FIG. 3, when he sits on the seat. This makes him feel that he is sunk into the seat. In addition, the sheet-like spring 1 is pressed against his hip to disturb the circulation of blood there, thereby making him more fatigued. Further, when the upper half of his body swings left and right, as shown in FIG. 4, the whole of the sheet-like spring 1 is flexibly extended, following his swinging body, thereby making him feel that he is not stably held on the seat.

SUMMARY OF THE INVENTION

A seat structure according to the present invention includes support panels for supporting those portions of a person's body which are strongly pressed by the seat when he sits on it, and sheet-like springs stretched between seat frames to fix the support panels.

Those portions of his body which are more strongly pressed by the seat when he sits on it, that is, his ischium torus, lumbar and scapular portions, are supported by the support panels, which are further supported by the sheet-like springs. This prevents his body from being locally pressed by the seat and also prevents him from feeling that he is sunk into the seat when he sits on it, thereby enabling him to feel that he is securely held on it.

The vehicle seats on which persons may be seated for a long time are designed so that the distribution of pressure which is added to their bodies by the seats, i.e., the distribution of body-pressing pressure is correct and comfortable. However, they are different from one another in their physical outline and the distribution of pressure which is preferable to one may not be comfortable to others. It is therefore advantageous to provide various degrees of the body-pressing pressure distribution without changing the seat structure much. According to the present invention, various degrees of the body-pressing pressure distribution can be provided by changing the support panels fixed on the sheet-like springs but using the same seat frames.

An object of the present invention is therefore to provide an improved seat structure in which the sheet-like springs are used.

Another object of the invention is to provide a seat structure capable of preventing persons from feeling as if they were sunk into seats when they are seated on them.

A further object of the present invention is to provide a seat structure capable of making persons feel that they are securely held on seats when they are seated on them.

These and other objects as well as merits of the present invention will become apparent from the following detailed description with reference to the accompanying drawings.

DETAILED DESCRIPTION OF THE PREFERRED EMBODIMENTS

Figure 1:
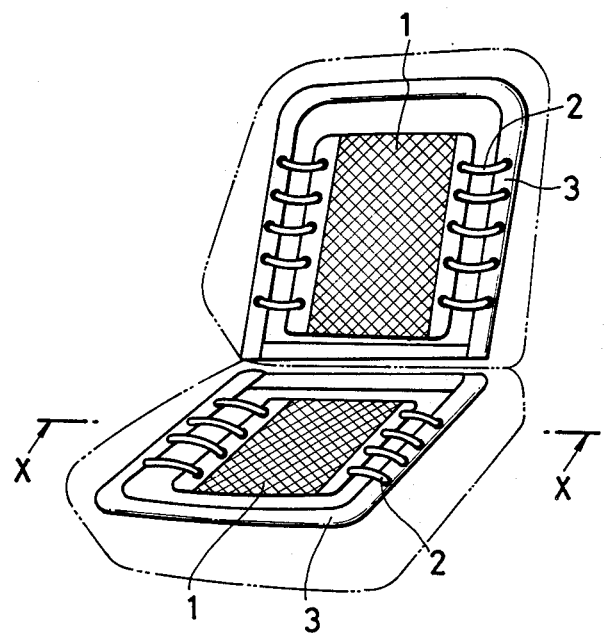
FIG. 1 is a perspective view showing an example of the vehicle seat provided with the conventional seat structure.
Figure 2:
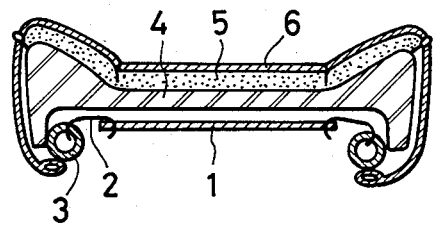
FIG. 2 is a sectional view taken along a line X—X in FIG. 1.
Figure 3:
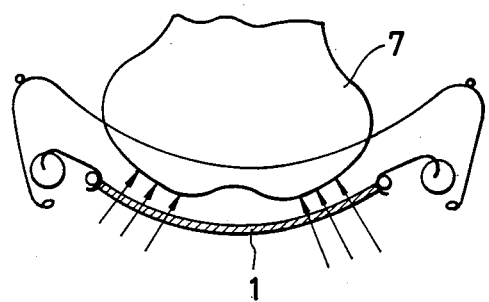
FIGS. 3 and 4 are intended to explain how the vehicle seat shown in FIG. 1 acts when a person is seated on it.
Figure 4:
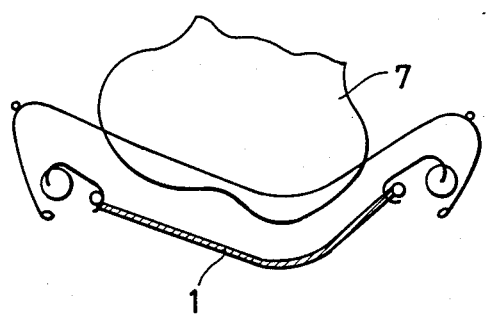
Figure 5:
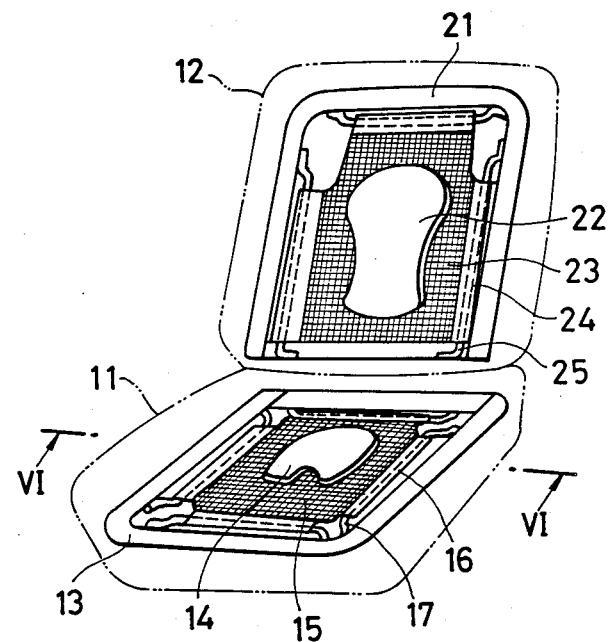
FIG. 5 is a perspective view showing an example of the vehicle seat provided with a seat structure of the present invention.
Figure 6:
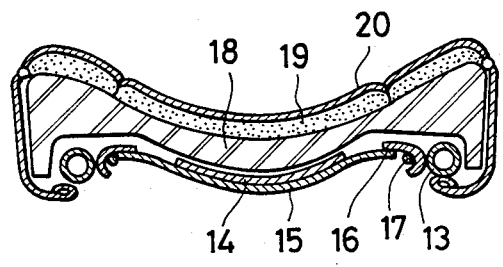
FIG. 6 is a sectional view taken along a line VI—VI in FIG. 5.

The seat shown in FIG. 5 is divided into a seat cushion 11 and a seat back 12. The seat cushion 11 includes a rectangular cushion frame 13 therein and a sheet-like spring 15 having a support panel 14 made of resin and intended to receive the ischium torus portion of a human body is spread in the cushion frame 13. The support panel 14 made of resin and having a certain elasticity lower than that of the sheet-like spring 15 is designed to have such a shape and a position as to enable an excellent distribution of the body-pressing pressure to be gained on the human body at the ischium torus portion thereof. The support panel 14 is located on the surface of the sheet-like spring 15 and made integral to the latter. The sheet-like spring 15 is made of cloth comprising woofs of resin fibers having high elasticity and warps of resin fibers having low elasticity. A strap-like resin hook 16 is made integral to each of four sides of the rectangular sheet-like spring 15 and these strap-like hooks 16 are suspended from wires 17 each welded to the inner rim of the cushion frame 13 to keep the sheet-like spring 15 stretched in the cushion frame 13. A pad 18 is mounted on this frame assembly, which is further covered by a surface skin 20 with a wadding 19 interposed, as shown in FIG. 6. The outer rim of the surface skin 20 is fixed to the cushion frame 13 by means of hog rings (not shown).

The seat back 12 has the substantially same structure as the above-described one of the seat cushion 11. A sheet-like spring 23 having a support panel 22 made of resin and intended to receive the shoulder blade and lumbar portions of human body is spread in a rectangular back frame 21 in such a way that resin hooks 24 which are made integral to three sides but not to a lower one of the sheet-like spring 23, are suspended from wires 25 each welded to the inner rim of the back frame 21. The sheet-like springs 15 and 23 may be fixed to the frames 13 and 21 to hold their support panels 14 and 22 on their back sides.

When a person sits on the seat which has the above-described structure, his weight is efficiently supported by the resin-made support panels 14 and 22 which are suspended from the seat frames 13 and 21 by means of the sheet-like springs 15 and 23. Further, thanks to the right cushion effect which is doubled by the elasticities of the resin-made support panels 14, 22 and those of the sheet-like springs 15, 23, he does not feel any pressure added uncomfortably and locally to his body, nor does he feel as if he were sunk into the seat. Rather, he feels that he is securely held on the seat. Therefore, he can be made less fatigued and support himself more naturally on the seat.

Figure 7:
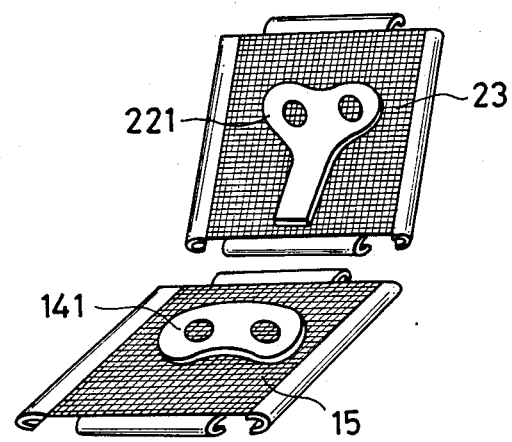
FIGS. 7, 8 and 9 are perspective views showing other seat structures of the present invention.
Figure 8:
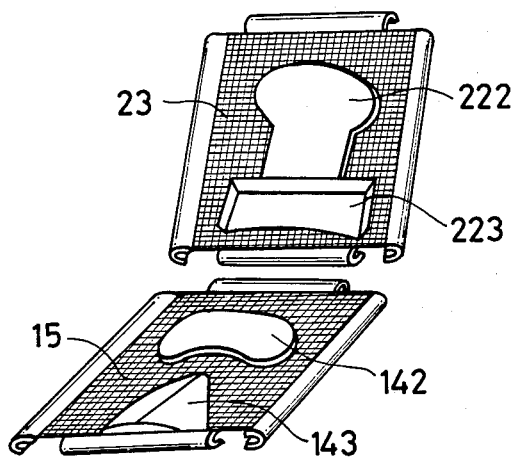
Figure 9:
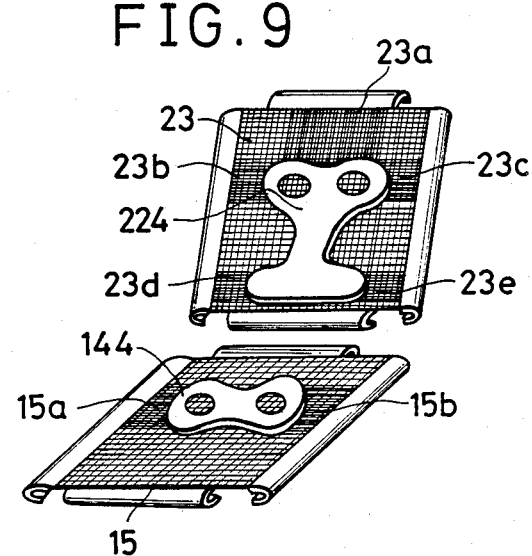

This seat structure may be changed as shown in FIG. 7, wherein resin-made support panels 141 and 221, different in shape from those as described above, are used without changing the size and structure of the seat itself to obtain a distribution of the body-pressing pressure most suitable for a particular person who sits on this seat. As shown in FIG. 8, a resin-made support panel 143 shaped like a flat triangular pyramid may be used, as a stopper, to locate between the thighs of the seated person, in addition to a resin-made support panel 142 which is intended to support his ischium torus portion. Further, a rectangular resin-made support panel 223 intended to support his lumbar portion may be made integral to a resin-made support panel 222 intended to support his shoulder blade portion, said support panel 223 being thicker than the support panel 222. When the resin-made support panels are changed of their shape, the sheet-like springs 15 and 23 become different in their areas spread outside these support panels and their spring characteristics are changed accordingly. Taking this into consideration, the resin-made support panels may be shaped to provide an optimum distribution of the body-pressing pressure. Alternatively, an optimum distribution of the body-pressing pressure may be provided by weaving fibers of higher elasticity into those portions of the sheet-like springs 15 and 23 which are adjacent to the resin-made support panels 14 and 22, that is, into both side portions 15a and 15b of a support panel 144 intended to support ischium torus portion of the seated person, and into an upper portion 23a, upper side portions 23b, 23c and lower side portions 23d, 23e of a support panel 224 intended to support his lumbar and shoulder blade portions, as shown in FIG. 9.

Figure 10:
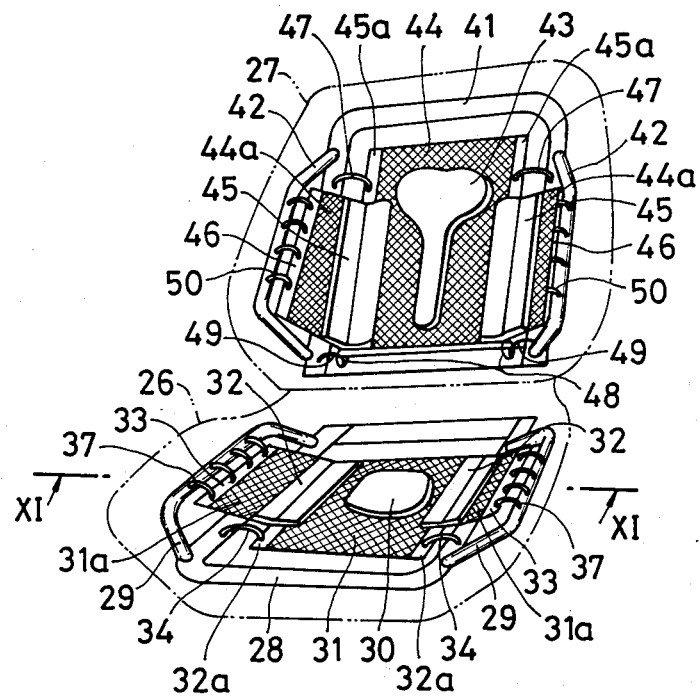
FIG. 10 is a perspective view showing an example of the vehicle seat provided with a further seat structure of the present invention.
Figure 11:
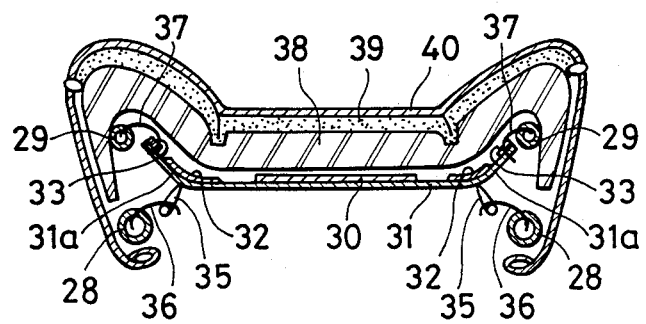
FIG. 11 is a sectional view taken along a line XI—XI in FIG. 10.

FIG. 10 shows another example of the seat structure according to the present invention. This seat structure is applied to the seat of the bucket type, which is divided into a seat cushion 26 and a seat back 27. The seat cushion 26 includes a rectangular cushion frame 28 and side support frames 29 which are welded to both sides of the cushion frame 28. A resin-made support panel 30 intended to support the ischium torus portion of human body is made integral to a sheet-like spring 31, which is plain-woven with resin fibers, substantially in the center thereof. The sheet-like spring 31 is provided with extended portions 31a on both sides thereof and a resin-made reinforcing panel 32 which is slightly curved upward is molded integral between the extended portion 31a and the sheet-like spring 31. Further, a strap-like resin-made rim piece 33 is molded integral to the outer side rim of each of the extended portions 31a. Reinforcing sub-panels 32a each extended from a part of that side of the sheet-like spring 31 from which the extended portions 31a is also spread are hooked to the cushion frame 28 through suspended wires 35 by means of hooks 36, and the rim pieces 33 are hooked to the side support frames 29 by hooks 37, respectively, as shown in FIG. 11. A pad 38 is mounted on this frame assembly, which is further covered by a surface skin 40 with a wadding 39 interposed. The outer rim of the surface skin 40 is fixed to the cushion frame 28 by means of hog rings (not shown).

The seat back 27 shown in FIG. 10 has the substantially same structure as that of the seat cushion 26. Side support frames 42 are welded to both sides of rectangular back frame 41, respectively. A resin-made support panel 43 which is intended to support the lumbar and shoulder blade portions of the seated person is molded integral to a sheet-like spring 44, same in material as the one 31, substantially in the center thereof. The sheet-like spring 44 is provided with extended portions 44a on both sides thereof and a resin-made reinforcing panel 45 which is slightly curved upward is molded integral to the border between the extended portion 44a and the spring 44. Further, a strap-like rim piece 46 is molded integral to the outer rim of each of the extended portions 44a. Reinforcing sub-panels 45a each extended from a part of that side of the sheet-like spring 44 from which the extended portion 44a is also spread are hooked to the back frame 41 by means of hooks 47. The reinforcing panels 45 are hooked to the back frame 41 through suspended wires 48 by means of hooks 49 and the rim pieces 46 are also hooked to the side support frames 42 by hooks 50. A pad is mounted on this frame assembly, which is further covered by a surface skin with a wadding interposed. The outer rim of the surface skin is fixed to the back frame 41.

According to this seat structure, the reinforcing panels 32, 45 and sub-panels 32a, 45a serve to hold the sheet-like springs 31, 44 and their extended portions 31a, 44a as they are shaped and to support the seated person from his both sides. This cooperates with the action of the support panels 30 and 43 to make him feel that he is securely held in the seat.

Figure 12:
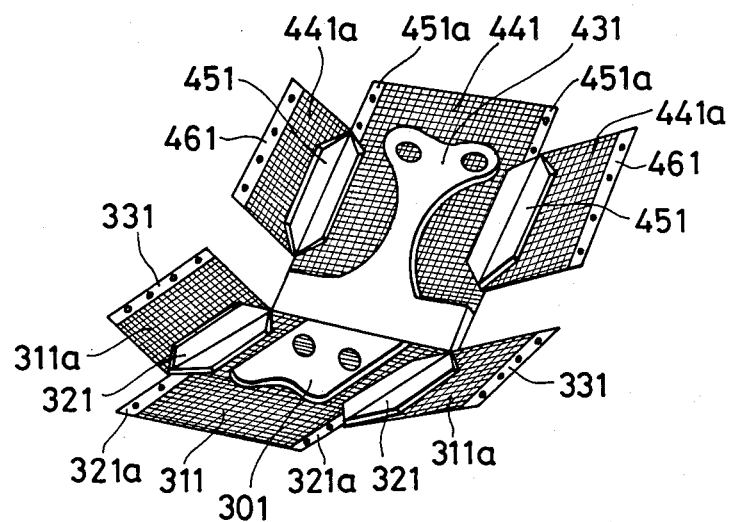
FIG. 12 is a perspective view showing a still further example of the seat structure according to the present invention.

This seat structure can also be applied to the seat of the bucket type in which the seat cushion and back are formed as a unit, when a resin-made support panel 301 which is intended to support the ischium torus portion of the seated person and a resin-made support panel 431 which is intended to support his lumbar and shoulder blade portions are molded, as a unit, integral onto a continuous sheet of springs 311 and 441, as shown in FIG. 12. This example is different from the one shown in FIG. 10 in the shape of the panels but fundamentally same in structure. The sheet-like spring portions 311 and 441 which are located at the seat cushion and back are provided with extended portions 311a and 441a. Resin-made reinforcing panels 321 and 451 provided with extensions 321a and 451a are molded integral to borders between the extended portion 311a and the sheet-like spring portion 311 and between the extended portion 441a and the sheet-like spring portion 441, respectively. Further, resin-made rim pieces 331 and 461 are molded integral to outer side rims of the extended portions 311a and 441a, respectively, and they are hooked to the cushion and back frames and the side support frames, respectively. These frame assemblies are covered by pads, waddings and surface skins to form a seat.

Although the support panels have been made of resin in the above-described examples, soft rubber, wood and metal may be used in the form of plates. The sheet-like spring may be woven by fibers made of other material, or plates of soft rubber or elastic resin may be used as the sheet-like spring.

Although the present invention has been described citing its preferred embodiments, it should be understood that various changes and modifications can be made without departing from the spirit and scope of the present invention.

We claim:

1. A seat structure comprising:
   a seat frame;
   a back frame;
   sheet-like springs supported by said seat frame and by said back frame;
   support panels fixed on each sheet-like spring for supporting selected portions of a person seated on the seat structure;
   portions extending continuously from sides of each of said sheet-like springs;
   reinforcing panels connected to said seat frame and to said back frame, each of which is curved slightly upward and fixed on a border between each of said sheet-like springs and each of said extended portions;
   a strap-like rim piece fixed to an outer side of each of said extending portions; and
   side support frames fixed to said seat frame and said back frame and to which said rim pieces are hooked.

2. The seat structure according to claim 1, wherein said support panels are selected to support ischium torus, lumbar and shoulder blade portions of the person seated and said support panels are continuous from one another.

3. A seat structure comprising:
   a seat frame;
   a back frame;
   sheet-like springs supported by said seat frame and by said back frame;
   support panels fixed on said sheet-like springs for supporting selected portions of a person seated on the seat structure;
   portions extending continuously from both sides of each of said sheet-like springs;
   reinforcing panels connected to the seat frame, each of which is slightly curved upward and fixed on a border between said sheet-like spring and said extending portion;
   strap-like rim pieces, each fixed to the outer side of each of said extending portions;
   side support frames fixed to said seat frame and said back frame and to which said rim pieces are hooked;
   pads for covering said sheet-like springs, support panels, extending portions, reinforcing panels, strap-like rim pieces and side support frames of said seat and back frames; and
   surface skins provided with a wadding and serving to cover said pads.

4. The seat structure according to claim 3, wherein said support panels are selected to support ischium torus, lumbar and shoulder blade portions of the person seated, are continuous from one another and are fixed onto a sheet of said sheet-like springs.

5. The seat structure according to claim 3, wherein said support panels are made of synthetic resin.

6. A seat structure according to claim 3, wherein said sheet-like spring is a sheet of cloth plain-woven by synthetic resin fibers.

7. The seat structure according to claim 3, wherein said support panels are made of synthetic resin and molded integral to the sheet of cloth plain-woven by synthetic resin fibers.

* * * * *